W. M. SCARBOROUGH.
ILLUMINATED LENS SIGN.
APPLICATION FILED MAR. 25, 1914.
1,130,201.
Patented Mar. 2, 1915.
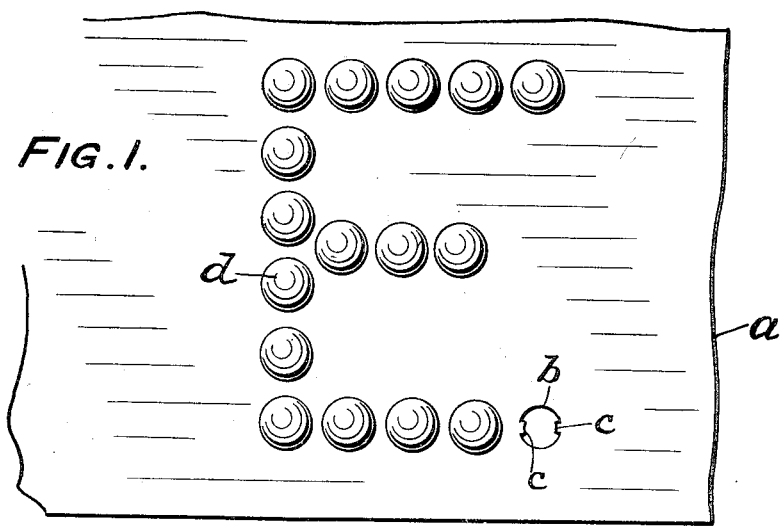
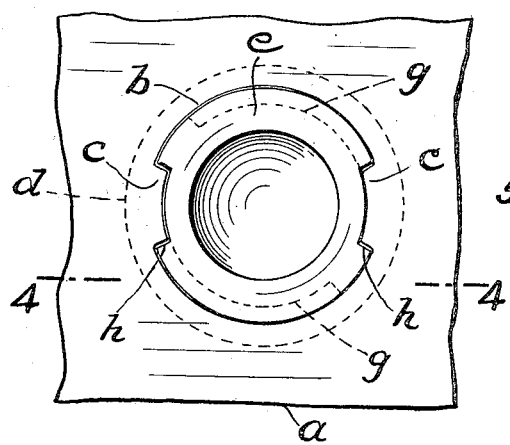
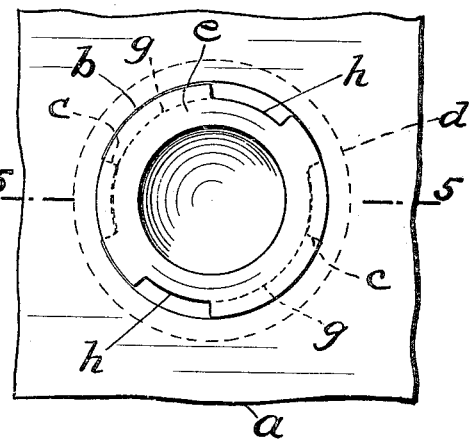
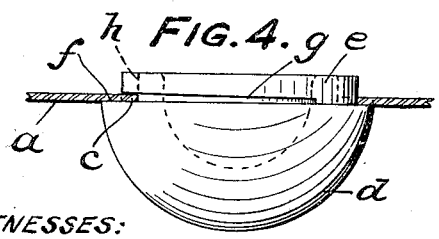
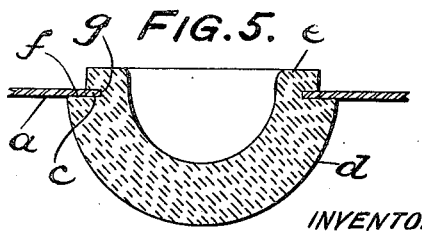
WITNESSES:
Robt R Kitchel
E. E. Wall
INVENTOR
Walter M. Scarborough
BY Frank S. Busser
ATTORNEY.

UNITED STATES PATENT OFFICE.

WALTER M. SCARBOROUGH, OF LANCASTER, PENNSYLVANIA.

ILLUMINATED-LENS SIGN.

1,130,201.  Specification of Letters Patent.  Patented Mar. 2, 1915.

Application filed March 25, 1914. Serial No. 827,082.

*To all whom it may concern:*

Be it known that I, WALTER M. SCARBOROUGH, a citizen of the United States, residing at Lancaster, county of Lancaster, and State of Pennsylvania, have invented a new and useful Improvement in Illuminated-Lens Signs, of which the following is a full, clear, and exact description, reference being had to the accompanying drawings, which form a part of this specification.

My invention relates to that form of sign composed of a metal sheet casing containing illuminating lamps and provided with orifices in which are inserted glass lenses, the orifices and lenses being arranged to form outlines of letters or other characters.

Heretofore various means have been employed for insetting the lenses in the orifices. They have been fastened in place by cement and other adhesives; by shoulders, grooves, lugs, etc., on the lenses coöperating with notches, lugs, tongues, etc., at the margins of the orifices, sometimes associated with wire or washers arranged between the lugs and plate; by screw threads of different forms on the shanks of the lenses coöperating with notches or slits in the margins of the orifices; and by other means. These securing means are open to various objections. The lenses can be secured in place with difficulty and their insertion requires the exercise of some skill and the expenditure of considerable time; the lenses are often broken in the attempt to force them in place; the face plate is distorted where a screw thread is used; permanently tight joints are not always secured, and the lenses sometimes work loose and drop out; and the manufacture of the face plates and lenses equipped with the necessary securing means involves considerable expense.

The objects of my invention are to enable the face plates and lenses to be manufactured at a minimum of expense; to enable the lenses to be secured in place with expedition and by unskilled workmen; to avoid breakage of the lenses and distortion of the face plate; and to provide a permanently tight joint so that the lenses cannot work loose or out of position.

I will first describe a preferred embodiment of my invention and will then point out in the claims the essential features thereof.

In the drawings: Figure 1 is a front view of a portion of a face plate with lenses in position. Fig. 2 is an enlarged rear view of one of the lenses inserted in a face plate, showing its initial position in the operation of applying it to a face plate. Fig. 3 is a similar view showing the lens in final position on a face plate. Fig. 4 is a view taken on the line 4—4 of Fig. 2. Fig. 5 is a cross-section on the line 5—5 of Fig. 3.

The face plate $a$ of the sign is provided with orifices $b$, a number of such orifices being arranged to form each letter or character. The orifices are circular except that there project inwardly from the peripheral edge of each orifice two diametrically opposite projections $c, c$.

Each lens is composed of a rounded head $d$ and a shank $e$ of a maximum diameter somewhat less than the maximum diameter of the head, thereby forming an annular shoulder $f$ on the under or inner side of the head surrounding the shank. The maximum diameter of the shank $e$ is about equal to the diameter of the orifice $b$ in the face plate. The shank is cut away to form two diametrically opposite recesses $h, h$, to accommodate the projections $c, c$ of the face plate. The shank is further cut away to form grooves $g, g$, adjacent to the shoulder $f$. Each groove $g$ is of a depth about equal to the depth of a recess $h$, and extends from one of such recesses toward, but terminates short of, the other recess. Each groove diminishes in width toward its closed end, as clearly shown in Fig. 4.

To apply a lens to the face plate, the same is brought opposite the orifice in which it is to be secured, with the projections $c$ alined with the recesses $h$. The shank may thus be passed into the orifice until the shoulder $f$ of the head $d$ rests against the face plate. This brings the projections $c$ in alinement with the entrances to the respective grooves $g$. This position is shown in Fig. 2. The lens may then be turned (but in only one direction), causing each projection $c$ to pass into its corresponding groove $g$, the turning movement continuing until the projections abut against the closed ends of their respective grooves, as shown in Fig. 3. Owing to the width of the grooves $g$ diminishing toward their closed ends until they are no wider than the thickness of the projections $c$, the latter will bind tightly in the grooves when, or even possibly before, they have reached the closed ends of the grooves, and thus the lens will be wedged firmly in position.

A lens so fastened in place will hold with absolute security. It cannot become accidentally loosened, and can only be removed by turning it in the opposite direction with a degree of force required to overcome the tight wedging engagement of the projections in their grooves. The lens may be readily secured in place by a boy or other unskilled workman; the expense of manufacture is slight; the face plate remains unweakened; and there are no projections on the glass lens which might readily lend themselves to breakage.

Having now fully described my invention, what I claim and desire to protect by Letters Patent is:

1. In a sign, a face plate of sheet metal containing a substantially circular orifice having a projection extending inward from the margin thereof, and a lens having a head and a shank of a diameter substantially smaller than that of the head and not greater than the diameter of the orifice in the face plate, said shank being cut away throughout its height to form a recess of an area not less than that of said projection so as to permit the projection to enter into said recess without distortion, the unrecessed part of the shank provided with a groove beneath the shoulder, one end of said groove opening into said recess and the other end being closed, the open end of the groove being of a width only sufficiently greater than the thickness of said projection to admit the latter's free entry and the groove diminishing in width toward its closed end until it is at most no wider than the thickness of the projection.

2. In a sign, a face plate of sheet metal containing a substantially circular orifice having a projection extending inward from the margin of the orifice, and a lens having a head and a shank of a diameter substantially smaller than that of the head and not greater than the diameter of the orifice in the face plate, said shank being cut away throughout its height to form a recess of an area not less than that of the projection so as to permit the projection to enter into said recess without distortion, the unrecessed part of the shank provided with a groove opening at one end into said recess and whose base and one of whose side walls substantially coincide respectively with the two circumferentially extending walls of said recess, the other end of said groove being closed, said groove having plain side walls and toward its closed end a width not greater than the thickness of the face plate whereby the projection on the plate will be held within the groove by frictional engagement between the side walls thereof.

In testimony of which invention, I have hereunto set my hand, at Lancaster, on this 19th day of March, 1914.

WALTER M. SCARBOROUGH.

Witnesses:
CHAS. E. LONG,
E. M. MILLER.

Copies of this patent may be obtained for five cents each, by addressing the "Commissioner of Patents, Washington, D. C."